US012754531B2

(12) United States Patent
Tomasi et al.

(10) Patent No.: US 12,754,531 B2
(45) Date of Patent: Oct. 6, 2026

(54) APPARATUS AND METHOD FOR ASSEMBLING A BATTERY PACK FOR POWERING ELECTRIC TRACTION MOTORS OF ELECTRIC MOTOR-VEHICLES

(71) Applicant: Comau S.p.A., Grugliasco (IT)

(72) Inventors: Daniele Tomasi, Grugliasco (IT); Daniele Ruffino, Grugliasco (IT); Tiziano Bertolo, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 403 days.

(21) Appl. No.: 18/562,698

(22) PCT Filed: May 24, 2022

(86) PCT No.: PCT/IB2022/054834

§ 371 (c)(1),
(2) Date: Nov. 20, 2023

(87) PCT Pub. No.: WO2022/249049

PCT Pub. Date: Dec. 1, 2022

(65) Prior Publication Data

US 2024/0231328 A1 Jul. 11, 2024

(30) Foreign Application Priority Data

May 26, 2021 (IT) ........................ 102021000013649

(51) Int. Cl.
*G05B 19/418* (2006.01)
*H01M 10/04* (2006.01)

(52) U.S. Cl.
CPC ... *G05B 19/41805* (2013.01); *G05B 19/4189* (2013.01); *H01M 10/0404* (2013.01); *G05B 2219/31044* (2013.01)

(58) Field of Classification Search
CPC ................................................ G05B 19/41805
See application file for complete search history.

(56) References Cited

U.S. PATENT DOCUMENTS

| | | | | |
|---|---|---|---|---|
| 9,694,838 | B2 | 7/2017 | Gullino et al. | |
| 11,975,413 | B2 * | 5/2024 | Boehmer | B23P 21/004 |

(Continued)

FOREIGN PATENT DOCUMENTS

| | | | |
|---|---|---|---|
| CN | 108 063 277 | A | 5/2018 |
| CN | 109 193 015 | A | 1/2019 |
| WO | 2022/208372 | A1 | 10/2022 |

*Primary Examiner* — Nathan L Laughlin

(57) ABSTRACT

An apparatus for assembling a multi-level battery pack. First and second processing lines are oriented parallel to one another and each containing successive work stations facing a respective work station of the other first or second processing line. The first processing line is configured to assemble a base level of the battery pack and the second processing line is configured to assemble successive level modules of the battery pack. First and second transport vehicles transport components along the respective processing line to provide components to the respective processing line and respective work station. A joining station is included in the respective processing line to join the battery pack successive level modules to the base level. The transport vehicles return to a starting point to begin a new battery pack assembly.

14 Claims, 5 Drawing Sheets

(56) References Cited

U.S. PATENT DOCUMENTS

| | | | | |
|---|---|---|---|---|
| 2007/0129831 | A1* | 6/2007 | Encinas | B66B 21/00 700/95 |
| 2008/0015097 | A1* | 1/2008 | Jaeger | B23P 21/004 483/15 |
| 2011/0314665 | A1 | 12/2011 | Kilibarda | |
| 2016/0251045 | A1* | 9/2016 | Leo | B23K 26/21 29/897.2 |
| 2022/0161669 | A1* | 5/2022 | Ragot | H01M 50/249 |
| 2023/0104336 | A1* | 4/2023 | Eriksson | G01R 31/3648 324/430 |
| 2023/0361433 | A1 | 11/2023 | Serpi et al. | |

* cited by examiner

APPARATUS AND METHOD FOR ASSEMBLING A BATTERY PACK FOR POWERING ELECTRIC TRACTION MOTORS OF ELECTRIC MOTOR-VEHICLES

CROSS-REFERENCE TO RELATED APPLICATION(S)

This application is filed pursuant to 35 U.S.C. § 371 claiming priority benefit to PCT/IB2022/054834 filed May 24, 2022, which claims priority benefit to Italian Patent Application No. 102021000013649 filed May 26, 2021, the contents of both applications are incorporated herein by reference in the entirety for all purposes.

TECHNICAL FIELD

The present invention refers to apparatuses and methods for assembling a battery pack for powering electric traction motors of an electric or hybrid motor-vehicle.

BACKGROUND

In the context of production plants of batteries to power the propulsion of electric vehicles, there is a need to make the assembly operations of different battery modules easy, repeatable and fast. The operations—which can be carried out by operators with the aid of automated systems—must be planned and implemented in such a way as to guarantee execution times compatible with the production rates of the automotive sector.

With reference to the specific application of a battery pack that has a multi-level configuration consisting of several side-by-side and overlapping modules, a consolidated technique involves assembling the levels in succession, starting from a base level, up to the completion of the last level. However, this technique is particularly susceptible to errors, in particular, to the sum of the various errors by extending the chain of tolerances, during execution of the assembly operations of the levels, as it becomes complex to correctly locate in position the different modules that must be mounted side-by-side and overlapping to form the different levels.

SUMMARY

More particularly, the invention relates to an apparatus of a production plant and a relative method for assembling a battery pack with a multi-level configuration formed by different battery modules side-by-side and superimposed.

The main object of this invention is to satisfy the aforesaid requirements in an optimal way.

Another object of the present invention is to provide an apparatus which can be easily integrated into a production environment.

Another object of the invention is that of producing an apparatus that can be implemented with manual, semi-automatic or fully automatic stations, guaranteeing accessibility from all sides of the battery pack being processed.

Another object of the invention is to provide an apparatus and a method of the type specified above which allows locating in position of the modules to be assembled in a processing station in an extremely precise manner and in an extremely reduced time.

Another object of the invention is to provide an apparatus and a method of the type indicated above, which have high flexibility characteristics, in terms of easy adaptability to a new application and/or changes in the layout of the production plant and/or in the path of the production line.

Yet another object of the invention is to provide an apparatus and a method of the type indicated above, which can be implemented with simple and low-cost means.

In order to achieve one or more of the aforesaid objects, the invention relates to an apparatus for assembling a battery pack for powering electric traction motors of electric motor-vehicles, wherein said battery pack has a multi-level configuration formed of different side-by-side and overlapping modules, said apparatus comprising:

- a plurality of processing or assembly stations arranged in succession, and designed to work or assemble the different modules that form the levels of the battery pack,
- a first and a second processing line parallel to each other, each facing a respective side of the stations,
- a first transport device configured for transporting, along said first line through the stations, a first group of components of the battery pack arranged to form a base level of said multi-level configuration,
- a second transport device configured to transport, along said second line through the stations, a second group of components of the battery pack arranged to form successive levels to be overlapped on the base level,
- wherein said first and second transport devices are configured to advance simultaneously along the respective line and station the respective groups of components in a working area of a respective station, in order to enable an intervention on both the groups of components transported by the transport devices, for manufacturing, separately, the different levels,
- a joining station of the levels configured to assemble said second group of components above said first group of components, so as to overlap and assemble together the levels formed in the previous stations.

The invention also relates to the method implemented by means of the apparatus described above.

Further characteristics and advantages of the invention are indicated in the attached dependent claims.

BRIEF DESCRIPTION OF THE DRAWINGS

Further characteristics and advantages of the invention will become apparent from the description that follows with reference to the attached drawings, provided purely by way of non-limiting example, wherein.

DETAILED DESCRIPTION

In the following description various specific details are illustrated aimed at a thorough understanding of examples of one or more embodiments. The embodiments can be implemented without one or more of the specific details, or with other methods, components, materials, etc. In other cases, known structures, materials, or operations are not shown or described in detail to avoid obscuring various aspects of the embodiments. The reference to “an embodiment” in the context of this description indicates that a particular configuration, structure or characteristic described in relation to the embodiment is included in at least one embodiment. Therefore, phrases such as “in an embodiment”, possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not, therefore, delimit the field of protection or the scope of the embodiments.

Figure 1:
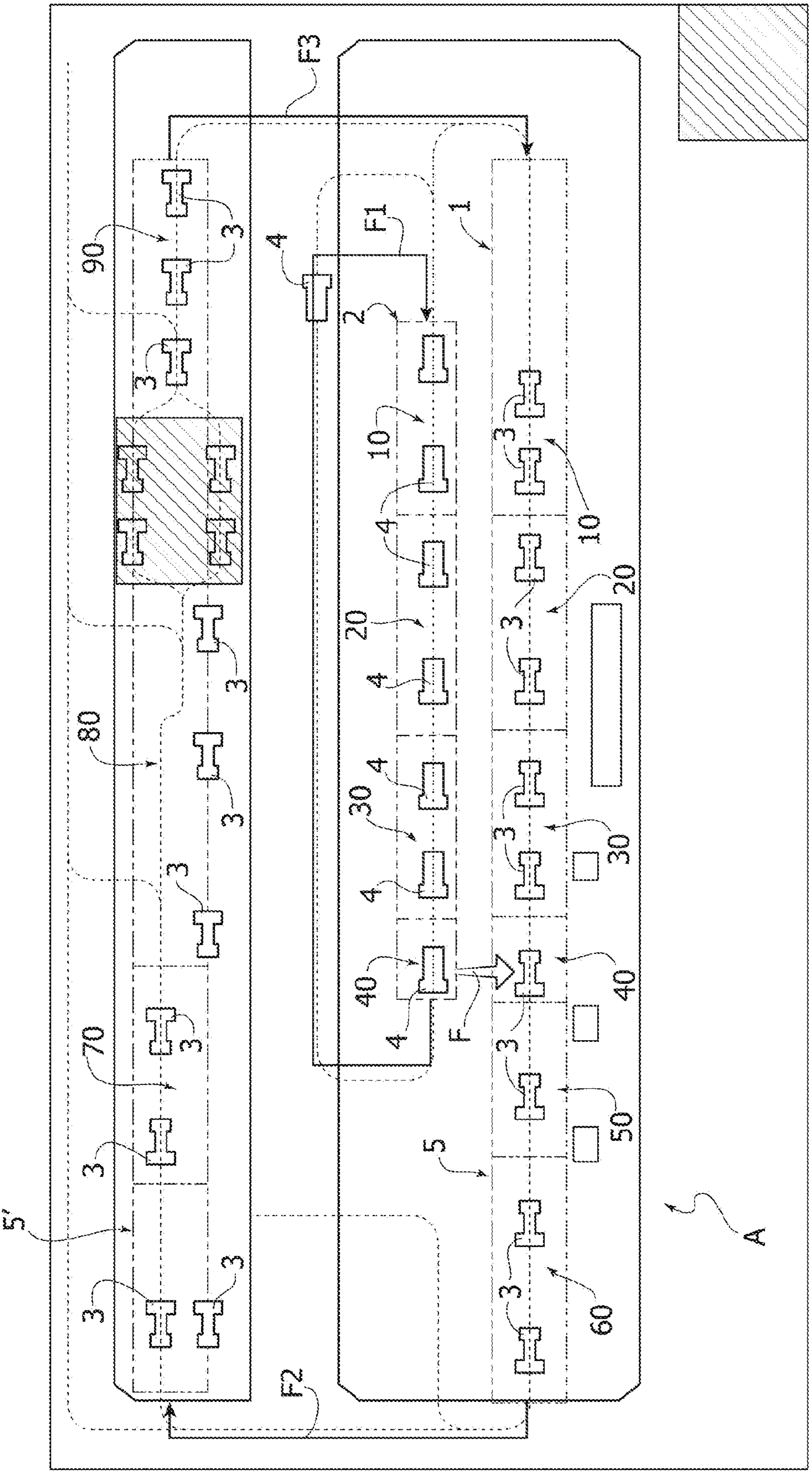
FIG. 1 is a schematic plan view that illustrates a preferred embodiment of an apparatus according to the present invention.

With reference to FIG. 1, reference A indicates—in its entirety—an apparatus of a production plant for use in assembling a battery pack B (illustrated in FIG. 2) for powering electric traction motors of electric motor-vehicles, wherein the battery pack B has a multi-level configuration B1, B2, B3, B4 made up of different side-by-side and overlapping modules.

The apparatus A comprises a plurality of processing or assembly stations 10, 20, 30, 40, 50, 60, 70, 80, 90 arranged in succession and designed to perform different operations of processing or assembly or waiting for the different modules that form the levels B1, B2, B3, B4 of the battery pack B according to the specific assembly cycle. The stations 10, 20, 30, 40, 50, 60, 70, 80, 90 may be configured in a fully automatic mode or in an at least partially manual mode.

The apparatus A also comprises a first and a second processing line 1, 2 oriented parallel to each other, each facing a respective side of a first series of stations 10, 20, 30 arranged in succession. The stations 10, 20, 30 are characterized in that they make the components to be processed—which are located in the working area—easily accessible from all sides for the operators who have to intervene in the working area. It should be noted that embodiments with more than two parallel lines, each facing an area of a respective station, fall within the invention.

Figure 2:
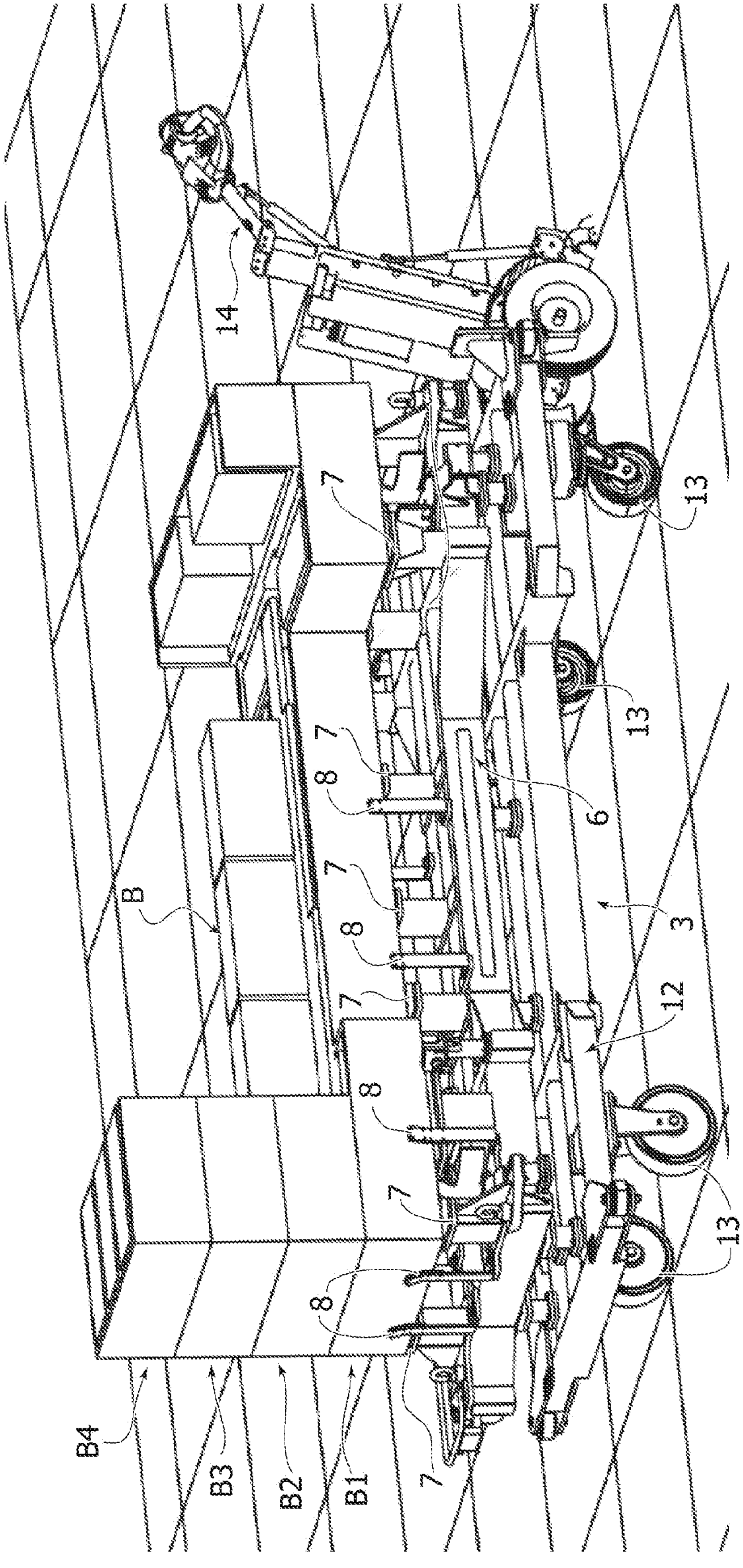
FIG. 2 is a perspective view illustrating a transport device designed to transport and locate a group of components of a battery pack in position.

According to an important characteristic of the invention, the apparatus A comprises a first transport device 3 arranged to transport, along the first line 1 through the stations 10, 20, 30, a first group of components C of the battery pack B arranged to form a base level B1 of the aforesaid multi-level configuration. As explained in detail below, in one or more embodiments, the transport device 3 is a trolley configured to transport a workpiece-holder frame 6, to locate the respective group of components C into position (FIG. 2).

According to another characteristic of the invention, the apparatus A comprises a second transport device 4, arranged to transport along the second line 2 through the stations 10, 20, 30, a second group of components C' of the battery pack B, which can form the successive levels B2, B3, B4 to be overlapped on the base level B1 of the battery pack B.

The transport devices 3, 4 are configured to advance the respective groups of components along the respective line 1, 2 and to station the respective groups of components in a working area of a respective station 10, 20, 30. As previously indicated, the stations 10, 20, 30 face both lines 1, 2, so as to allow (e.g., enable) an intervention on both groups of components transported by the transport devices 3, 4 for manufacturing, separately, the different levels.

Figure 3:
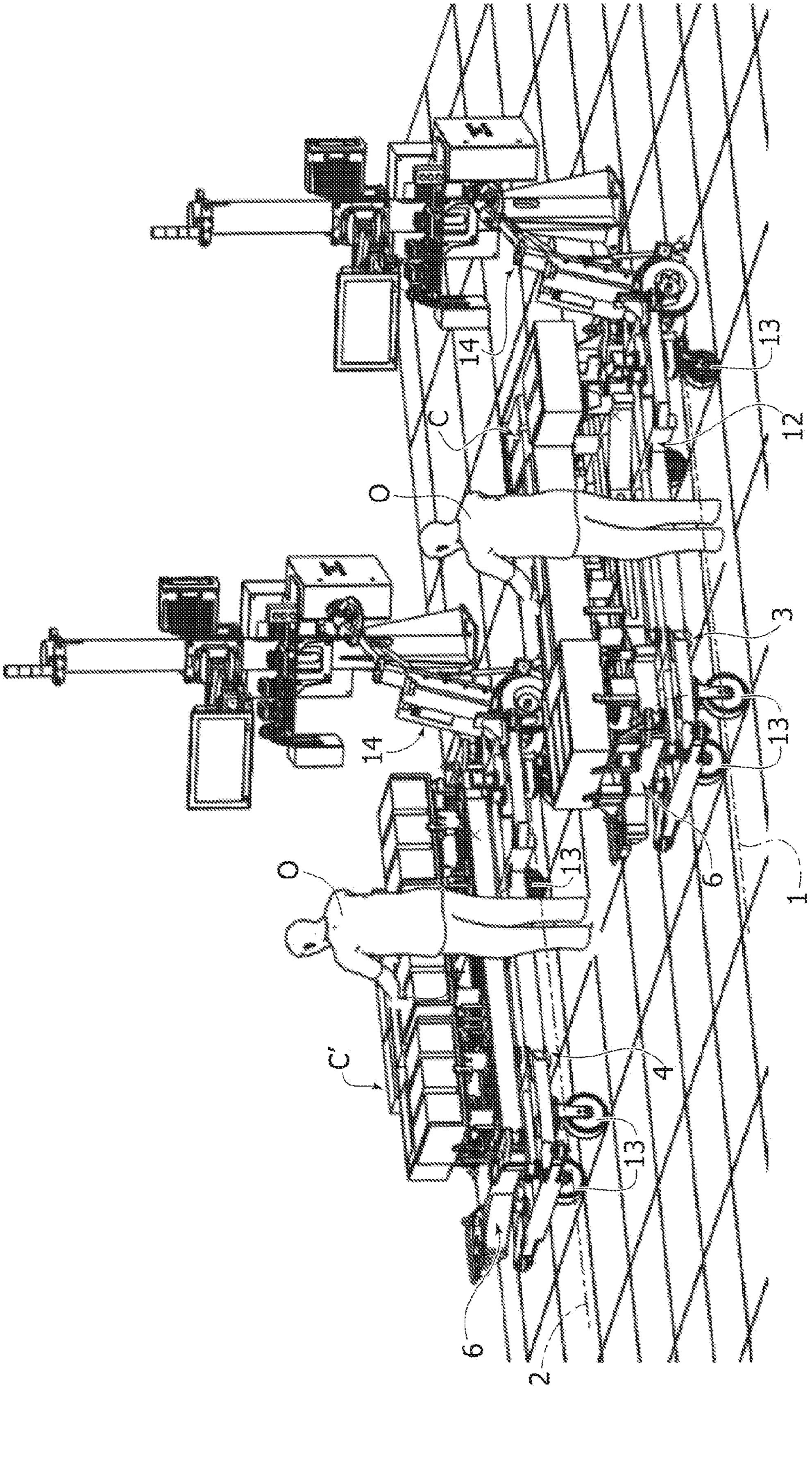
FIGS. 3-5 are schematic perspective views that illustrate some detailed characteristics of the apparatus of FIG. 1.

In one or more embodiments, the apparatus A envisages the advancement of the transport devices 1, 2 in parallel, and the stations 10, 20, 30 are configured to allow execution of different operations on both groups of components carried by the respective transport devices 3, 4, simultaneously, in such a way as to optimize production times. FIG. 3 illustrates one of the stations 10, 20, 30, wherein two operators O intervene simultaneously on the groups of components C, C' carried by the two transport devices 3, 4. It should be noted that, according to the specific multi-level battery application, the area occupied by the two groups of components C, C' on the respective transport device 3, 4 is substantially the same, since the dimensions of the successive levels B2, B3, B4 are less than those of the base level B1.

In one or more embodiments, as well as in the one illustrated in the drawings, the first and second transport devices 3, 4 are, respectively, a trolley configured to transport a workpiece-holder frame 6, to locate the respective group of components in position. The trolleys may be chosen from a manual traction trolley, a towable trolley with a motorized tractor, a motorized trolley, an AGV or an AMR. Of course, in accordance with that illustrated in FIG. 1, in order to optimize production times, the apparatus A may comprise a plurality of trolleys 3, 4 that advance in succession along the respective production line 1, 2, so as to obtain a flow of continuous production.

Alternatively, the apparatus A may comprise traditional-type transport devices such as motorized conveyors or roller conveyors, remaining within the scope of the present invention.

As illustrated in FIG. 2, the workpiece-holder frame 6 has a structure consisting of metal elements, for example, welded and/or bolted together, and includes a plurality of upper support surfaces 7 and positioning brackets 8 to support and locate the assembly in a precise (e.g., predetermined) position with respect to the workpiece-holder frame 6.

In the illustrated embodiment example, the workpiece-holder frame 6 is transported along the respective line 1, 2 by means of a trolley, with the workpiece-holder frame 6 carried above it. The trolley may be moved along the line 1, 2 in one direction or the other, depending on the needs of each specific application.

In the case of the illustrated example, the trolley is a simple manually-operated trolley including a frame 12 mounted on wheels 13 (in the example shown the front wheels are pivoting and the rear ones have a fixed axis). Again in the case of the illustrated example, the trolley is intended to be moved by means of a small tractor 14 with manual or motor-assisted operation, which is driven by an operator who pulls or pushes it along the lines 1, 2. The operator moves the trolley until it is brought to one of the stations.

One or more of the stations are configured to lift the workpiece-holder frame 6 away from the trolley and to locate it to a precise position both in a vertical direction Z and along two horizontal directions X, Y orthogonal to each other, and with respect to rotations in the horizontal plane. Once the operations (manual and/or automatic) in the working area on the workpiece thus located in position have been carried out, the apparatus of the station lowers the workpiece-holder frame 6, with the workpiece carried above it, above the trolley, after which the operator moves the trolley along the line 1, 2 taking it out of the working area, towards the subsequent stations of the plant.

Of course, the manually-operated trolley that is illustrated in the attached drawings could be replaced by any other type of manually-operated or motorized trolley, and in particular it could be replaced by an AGV (Automated Guided Vehicle) or AMR (Automated Mobile Robot).

Figure 4:
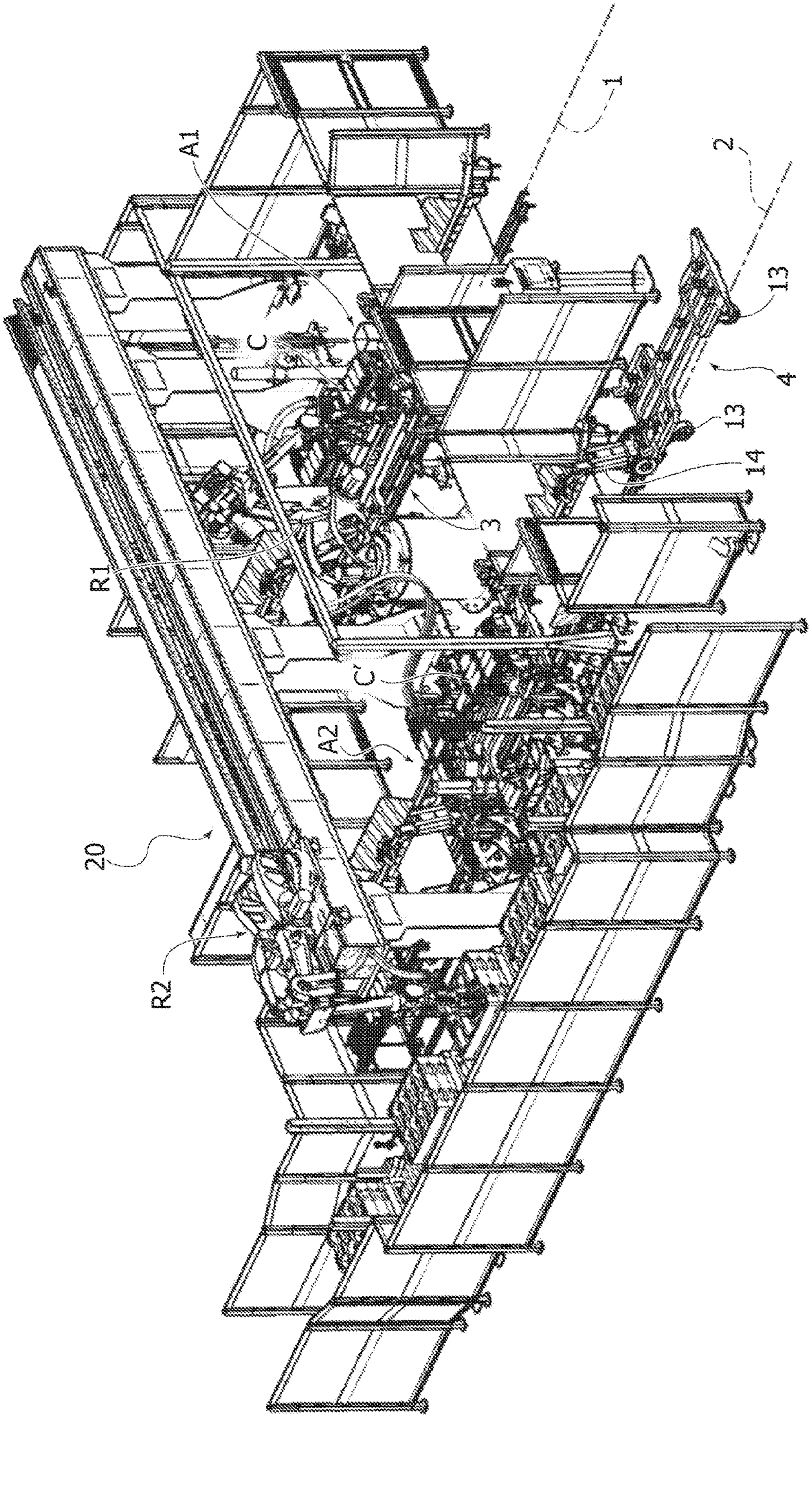

FIG. 4 is a schematic perspective view illustrating an embodiment example of one of the assembly stations 10, 20, or 30. The assembly station 20 comprises two working areas A1, A2, on which it is possible to operate simultaneously on the groups of components C, C' transported by the transport devices 3, 4, along the respective line 1, 2. The station may comprise an anthropomorphic robot R1 and a Cartesian robot R2 controlled to operate on both groups of components.

According to an important characteristic of the invention, the apparatus A comprises a station 40 for joining the levels of the battery pack B, configured to allow the assembly of the components C' forming the successive levels B2, B3, B4 above the components C forming the base level B1 of the multi-level configuration of the battery pack B.

In one or more embodiments, on the second transport device 4—along the first series of stations 10, 20, 30—the assembly of the components C' proceeds to form the successive levels B2, B3, B4, in order to arrive at the joining station 40, with the subsequent levels B2, B3, B4 completed and arranged side-by-side.

In one or more embodiments, the apparatus A is made in such a way as to make the two transport devices 3, 4 converge in a respective working area of the aforesaid joining station 40.

As previously mentioned, the subsequent levels B2, B3, B4 are assembled along the first series of stations 10, 20, 30, and are arranged side-by-side on the second transport device 4, when the transport device 4 is stationed in the joining station 40. In one or more embodiments, as well as in the one illustrated in the drawings, the aforesaid joining station 40 is configured to allow (e.g., enable) the movement of the second group of components C' forming the successive levels B2, B3, B4 towards the first transport device 3, which carries the base level B1, so as to proceed with the assembly by superimposing the levels B2, B3, B4 in succession (e.g., sequentially) above the base level B1 (operation schematically indicated by the arrow F in FIG. 1).

Figure 5:
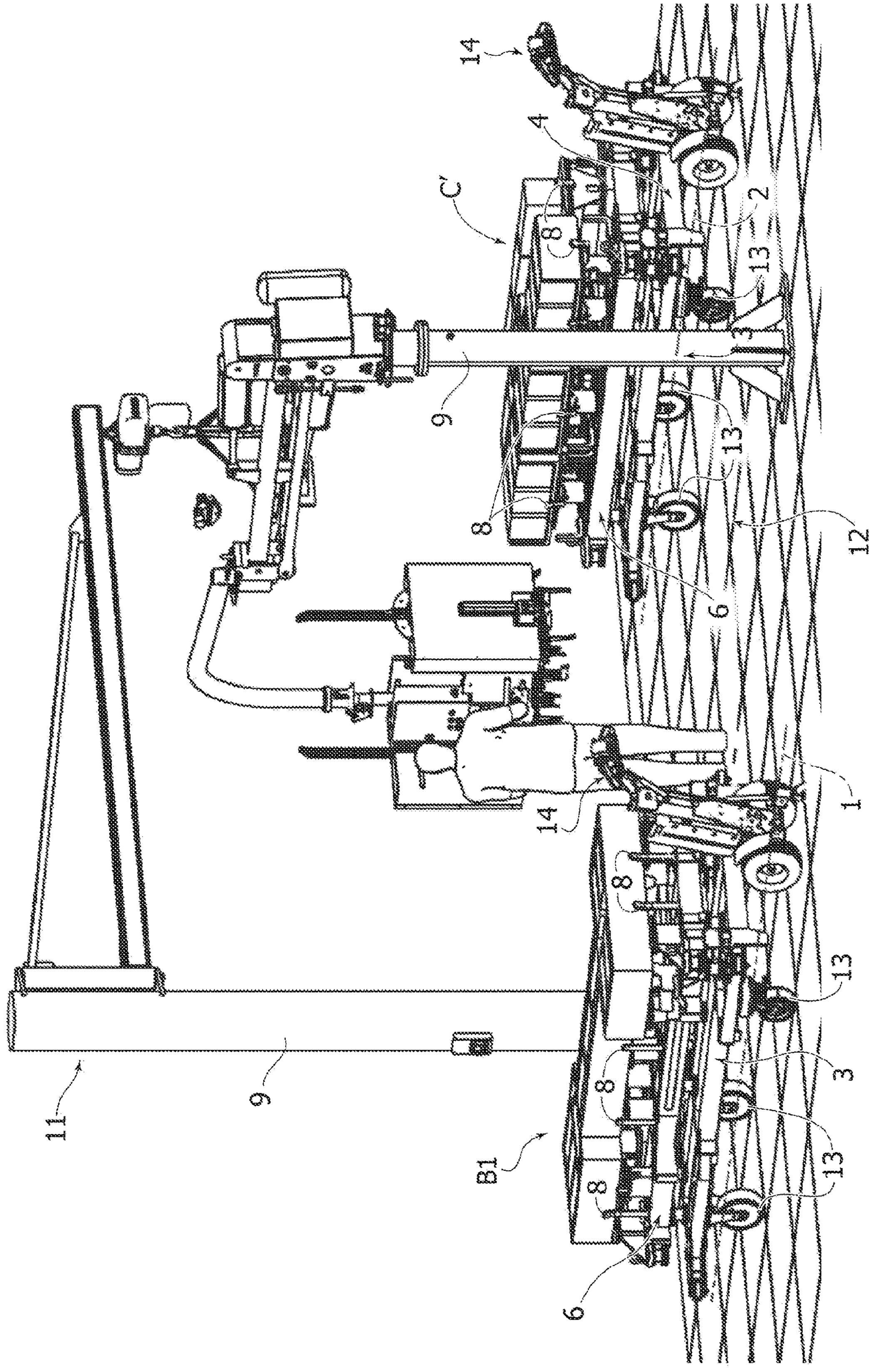

Preferably, the joining station 40 is configured in a partially manual mode. The joining station 40 comprises a manipulator 9 and a hoist 11 designed to facilitate the operations of moving and assembling the subsequent levels B2, B3, B4 above the base level B1 (FIG. 5). Of course, the joining station 40 may be made in other ways and with other equipment, as long as they are functional to achieve the intended objects.

As illustrated in FIG. 1, in one or more embodiments, the joining station 40 is arranged in succession with respect to the previous stations 10, 20, 30 arranged along the lines 1, 2. Therefore, similarly to the previous stations 10, 20, 30, the joining station 40 has two working areas facing, respectively, one of the two processing lines 1, 2. In this way, it is not necessary to make the transport devices 3, 4 converge towards the joining station 40, as it is located along the lines 1, 2, which the transport devices 3, 4 travel through before being stationed in the joining station. 40.

Thanks to the aforesaid characteristics, assembly of the levels B1, B2, B3, B4 takes place in such a way as to avoid errors due to having to correctly locate the different modules in position, which must be mounted side-by-side and overlapping.

In one or more embodiments, as well as in the one illustrated in FIG. 1, the apparatus A comprises additional processing or assembly stations 50, 60, 70, 80, 90 arranged in succession along a third processing line 5. Following joining of the levels B1, B2, B3, B4 at the joining station 40, the first transport device 3, on which all the levels of the battery pack B are located, is configured to continue along the aforesaid third line 5 through the aforesaid additional stations 50, 60, 70, 80, 90, so as to complete the construction of the battery pack B. Preferably, the aforesaid third line 5 comprises a first section, which is the extension of the first line 1 and a second section 5' parallel to the first line 1 (path schematically indicated with F2 in FIG. 1).

Following the operations of joining the levels B1, B2, B3, B4 of the battery pack B in the aforesaid joining station 40, the second transport device 4 is configured to return to an initial loading position at the beginning of the second line 4, to start a new path—along the second processing line 2—for producing an additional battery pack B (path schematically indicated with F1 in FIG. 1). Consequently, along the aforesaid path of the third line 5, it is only the first transport device 3 that continues its path along the additional stations 50, 60, 70, 80, 90. Preferably, the additional stations 50, 60, 70, 80, 90 have a single working area, since it is no longer necessary to carry out operations in parallel on two different lines.

Preferably, the aforesaid additional stations 50, 60, 70, 80, 90 are configured to carry out further processing on the battery pack B, such as, for example, completing the electrical and fluid connections, performing sealing operations and completing an acceptance test.

Once the assembly cycle of the battery pack B has been completed, the first transport device 3 is checked to allow discharge of the completed battery pack B, and to make the first transport device 3 converge towards an initial position along the first conveying line 1, in order to start the assembly operations of a new base level B1 of a new battery pack B (path schematically indicated with F3 in FIG. 1).

Of course, without prejudice to the principle of the invention, the details of construction and the embodiments may vary widely with respect to those described and illustrated, without departing from the scope of the present invention. In particular, the invention includes an apparatus such as the one indicated in the attached claim 1, wherein any other known type of transport device is provided instead of a trolley.

The invention claimed is:

1. An apparatus for use in assembling a battery pack for powering electric traction motors of electric motor-vehicles wherein said battery pack has a multi-level configuration formed by different modules arranged side-by-side and overlapping each other, said apparatus comprising:

a plurality of processing or assembly stations arranged in succession and configured to work or assemble the different modules that form the multi-level configuration of the battery pack;

a first and a second processing line oriented parallel to each other, wherein the respective stations of the first processing line face the respective stations of the second processing line;

a first transport device configured to transport, along said first processing line through the stations of the first processing line, a first group of components of the battery pack arranged to form a base level of said multi-level configuration;

a second transport device configured to transport, along said second processing line through the stations of the second processing line, a second group of components of the battery pack arranged to form successive levels configured to be overlapped on the base level, wherein said first and second transport devices are configured to advance simultaneously along the respective first or second processing line and station the respective first or second group of components in a working area of a respective station, in order to enable an intervention on both the first and second group of components transported by the respective transport devices, for manufacturing, separately, the base level and successive levels along the respective first or second processing line; and a joining station configured to assemble said successive levels from the second processing line above said base level of the first processing line, so as to overlap and assemble the multi-level configuration battery pack.

2. The apparatus according to claim 1, wherein said joining station is a manual or automatic station comprising a first and a second working area arranged, respectively, along said first processing line and said second processing line.

3. The apparatus according to claim 1, wherein said joining station is configured to enable moving of the second group of components forming the successive levels towards the first transport device which carries the base level, and assembling of the successive levels, sequentially above the base level.

4. The apparatus according to claim 1, wherein said first and second transport devices each comprise a trolley including a workpiece-holder frame.

5. The apparatus according to claim 4, wherein said first and second transport devices further comprise a manual traction trolley, a trolley towable with a motorized tractor, a motorized trolley, an automated guided vehicle (AGV) or an automated mobile robot AMR).

6. The apparatus according to claim 4, wherein said workpiece-holder frame is configured to support the respective first group of components or the second group of components, in a predetermined position with respect to the workpiece-holder frame.

7. The apparatus according to claim 1, comprising additional processing or assembly stations arranged in succession along a third processing line, the third processing line comprising:

a first section, which is an extension of the first processing line; and a second section oriented parallel to the first processing line, wherein the first transport device is configured to advance along said third processing line through the additional stations, in order to complete the manufacture of the battery pack.

8. The apparatus according to claim 7, wherein said additional stations are configured to carry out further processing on the battery pack to complete at least one of electrical or fluid connections, sealing operations, or an acceptance test.

9. A method for assembling a battery pack for use in powering electric traction motors of an electric motor-vehicle, wherein said battery pack has a multi-level configuration formed by different modules arranged side-by-side and overlapping each other, the method comprising:

providing a plurality of processing or assembly stations arranged in succession and configured to work or assemble the different modules that form the multi-level configuration of the battery pack;

providing a first and a second processing line oriented parallel to each other, wherein the respective stations of the first processing line face the respective stations of the second processing line;

providing a first transport device and a second transport device configured to transport respective components that form the multi-level configuration of the battery pack, the method further comprising:

providing a first group of components of the battery pack on the first transport device, said first group of components being arranged to form a base level of said multi-level configuration;

providing a second group of components of the battery pack on the second transport device, said second group of components being arranged to form successive levels to be overlapped on the base level of said multi-level configuration;

advancing the first and the second transport devices along the respective first processing line and the second processing line through the respective stations;

stationing the first and the second transport devices in a respective working area of one of the stations;

at each station, working simultaneously on said first and said second group of components following advancing of the first and the second transport devices along the respective first processing line and the second processing line and stationing of the first and the second transport devices in a respective station;

providing a joining station of the base level and the successive levels of the battery pack; and assembling said second group of components above said first group of components carried by the first transport device, in order to form the multi-level configuration of the battery pack.

10. The method according to claim 9, wherein, before stationing the second transport device at the joining station, assembling the second group of components on the second transport device in order to separately form the successive levels, so as to arrive at the joining station, with the successive levels completed and arranged side-by-side.

11. The method according to claim 10, wherein the joining station is configured to enable moving the successive levels towards the first transport device, which carries the base level, and assembling of the successive levels, sequentially above the base level.

12. The method according to claim 11, wherein following operations of joining the successive levels to the base level at the joining station, returning the second transport device to a starting loading position at a beginning of the second processing line, to start a new assembly path along the second processing line, for manufacturing an additional battery pack.

13. The method according to claim 9, further comprising:

providing additional processing or assembly stations arranged in succession along a third processing line, the third processing line comprising a first section which is an extension of the first processing line; and advancing the first transport device along said third processing line through the additional stations, so as to complete manufacturing of the battery pack.

14. The method according to claim 13, further comprising providing additional operations on the battery pack at said additional stations to complete at least one of electrical and fluid connections, sealing operations, or an acceptance test.

* * * * *